US010814954B2

(12) United States Patent
Zaman et al.

(10) Patent No.: US 10,814,954 B2
(45) Date of Patent: Oct. 27, 2020

(54) INSULATION SYSTEM (71) Applicant: The Boeing Company, Chicago, IL (US)

(72) Inventors: Arif Zaman, Everett, WA (US); Patrick M. Lane, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 728 days.

(21) Appl. No.: 15/407,733

(22) Filed: Jan. 17, 2017

(65) Prior Publication Data
US 2018/0201359 A1     Jul. 19, 2018

(51) Int. Cl.
*B64C 1/06*     (2006.01)
*B64C 1/40*     (2006.01)

(52) U.S. Cl.
CPC ............. *B64C 1/067* (2013.01); *B64C 1/40* (2013.01)

(58) Field of Classification Search
CPC .. B64C 1/40; B64C 1/403; B64C 1/00; B64C 1/06; B64C 1/067
See application file for complete search history.

(56) References Cited

U.S. PATENT DOCUMENTS

| | | | | |
|---|---|---|---|---|
| 5,398,889 A * | 3/1995 | White | ................ | B64C 1/067 244/119 |
| 5,759,659 A * | 6/1998 | Sanocki | ................ | F16L 59/02 244/119 |
| 6,358,591 B1 | 3/2002 | Smith | | |
| 7,584,582 B1 * | 9/2009 | Hutter, III | ................ | B64C 1/40 156/91 |
| 8,011,619 B2 * | 9/2011 | Mueller | ................ | A62C 2/06 244/121 |
| 8,245,974 B2 * | 8/2012 | Paul | ................ | B64C 1/403 244/119 |
| 8,308,103 B2 * | 11/2012 | Boock | ................ | B64C 1/403 244/1 N |
| 8,662,448 B2 * | 3/2014 | Weston | ................ | B64C 1/40 244/119 |
| 9,193,435 B2 * | 11/2015 | Holm | ................ | B64C 1/40 |
| 9,211,945 B2 * | 12/2015 | Redecker | ................ | B64C 1/067 |
| 9,988,137 B2 * | 6/2018 | Borumand | ................ | A62C 3/08 |
| 2006/0284014 A1 * | 12/2006 | Muller | ................ | A62C 2/06 244/119 |

(Continued)

FOREIGN PATENT DOCUMENTS

| | | | | |
|---|---|---|---|---|
| DE | 102010052671 A1 * | 5/2012 | ............ | B64C 1/067 |
| FR | 2967645 B1 * | 8/2013 | | |
| WO | WO-2012/069289 | * 5/2012 | | |

*Primary Examiner* — Benjamin P Lee
(74) *Attorney, Agent, or Firm* — Yee & Associates, P.C.

(57) ABSTRACT

An insulation system comprises a first insulation blanket and a second insulation blanket. The first insulation blanket extends circumferentially within a curved body. The second insulation blanket extends circumferentially within the curved body and covers a zero position of the curved body. A portion of the second insulation blanket covers a portion of the first insulation blanket so that the portion of the second insulation blanket is between the portion of the first insulation blanket and the curved body to form an overlap. The overlap is positioned within a range having an absolute value of 5 to 40 degrees from the zero position of the curved body.

20 Claims, 9 Drawing Sheets

(56) References Cited

U.S. PATENT DOCUMENTS

| | | | |
|---|---|---|---|
| 2010/0044512 A1* | 2/2010 | Paul | B64C 1/067 |
| | | | 244/129.1 |
| 2012/0126059 A1* | 5/2012 | Piuzzi | B64C 1/403 |
| | | | 244/119 |
| 2012/0234979 A1* | 9/2012 | Smith | B64C 1/40 |
| | | | 244/158.1 |
| 2013/0299630 A1* | 11/2013 | Redecker | B64C 1/067 |
| | | | 244/1 N |
| 2015/0300396 A1* | 10/2015 | Balderrama | F16B 37/048 |
| | | | 411/373 |
| 2017/0144743 A1* | 5/2017 | Dickson | B64C 1/40 |
| 2017/0197698 A1* | 7/2017 | Irwin | B64C 1/067 |
| 2017/0283031 A1* | 10/2017 | Borumand | A62C 3/08 |
| 2018/0201357 A1* | 7/2018 | Borumand | B64C 1/067 |
| 2019/0100298 A1* | 4/2019 | Gladstone | B64C 1/40 |

* cited by examiner

INSULATION SYSTEM

BACKGROUND INFORMATION

1. Field

The present disclosure relates generally to an insulation system, and more specifically, to an insulation system with an overlap. Still more particularly, the present disclosure relates to an insulation system with an overlap positioned within a range having an absolute value of 5 to 40 degrees from the zero position of a curved body.

2. Background

Insulation is installed on the inside of an airplane fuselage to provide at least one of noise reduction, thermal insulation, or fire protection to the airplane. Insulation also desirably protects the fuselage structure from exposure to water vapor on surfaces below the dew point temperature and the passenger cabin from exposure to liquid water that has condensed on the fuselage structure.

Insulation is wrapped around the airframe and skin within the fuselage. Due to at least one of performance standards, ease of installation, or fabrication preferences, insulation will be installed as discrete insulation blankets having overlaps. The overlaps create potential paths for water liquid and vapor to move from one side of the insulation to the other side of the insulation.

The potential paths for water liquid may make the insulation less effective at protecting the occupants from exposure to liquid water. For example, when condensate formed on the fuselage structure is in a liquid state and begins to move downward from the upper areas of the fuselage due to the force of gravity, any liquid that drips through the insulation overlaps may reach the occupied volumes of the passenger cabin and flight deck. This liquid is considered a nuisance to the occupants. Therefore, it would be desirable to have a method and apparatus that take into account at least some of the issues discussed above, as well as other possible issues. For example, it would be desirable to have a method and apparatus to decrease the water and vapor paths in the insulation system.

SUMMARY

In one illustrative embodiment, an insulation system is presented. The insulation system comprises a first insulation blanket and a second insulation blanket. The first insulation blanket extends circumferentially within a curved body. The second insulation blanket extends circumferentially within the curved body and covers a zero position of the curved body. A portion of the second insulation blanket covers a portion of the first insulation blanket so that the portion of the second insulation blanket is between the portion of the first insulation blanket and the curved body to form an overlap. The overlap is positioned within a range having an absolute value of 5 to 40 degrees from the zero position of the curved body.

In another illustrative embodiment, an aircraft is presented. The aircraft comprises an airframe and an insulation system. The airframe has stringers and a zero position associated with a crown of the airframe. The insulation system has an overlap secured only by a number of fasteners. The overlap is positioned relative to the zero position within a range having an absolute value of 5 to 40 degrees from the zero position. The insulation system comprises a first crown insulation blanket, a second crown insulation blanket, and the number of fasteners. The first crown insulation blanket has a first end at the overlap and a second end positioned relative to the zero position within a range having an absolute value of 50 to 80 degrees from the zero position. The second crown insulation blanket extends across the zero position. The second crown insulation blanket has a third end covering the first end of the first crown insulation blanket viewed from the airframe in an inboard direction to form the overlap and a fourth end positioned relative to the zero position within a range having an absolute value of 50 to 80 degrees from the zero position. The number of fasteners has a number of shafts extending through the first crown insulation blanket and the second crown insulation blanket at the overlap.

In yet another illustrative embodiment, a method is presented. A first insulation blanket is extended circumferentially within a fuselage of an aircraft. A second insulation blanket is extended circumferentially within the fuselage of the aircraft and covering a zero position associated with a crown of the fuselage. A portion of the second insulation blanket is covered with a portion of the first insulation blanket from an inside of the fuselage looking outboard to form an overlap positioned within a range of an absolute value of 5 to 40 degrees from the zero position of the curved body.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account one or more different considerations. For example, the illustrative embodiments recognize and take into account that there are various existing concepts to reduce the transport of water through insulation overlap, including continuous or intermittent Velcro attached to insulation coverfilm. In all cases, these concepts may still allow the transport of water, especially when the operations of the airplane and the environment inside the fuselage provide severe moisture loads and limited drying capability.

Figure 1:
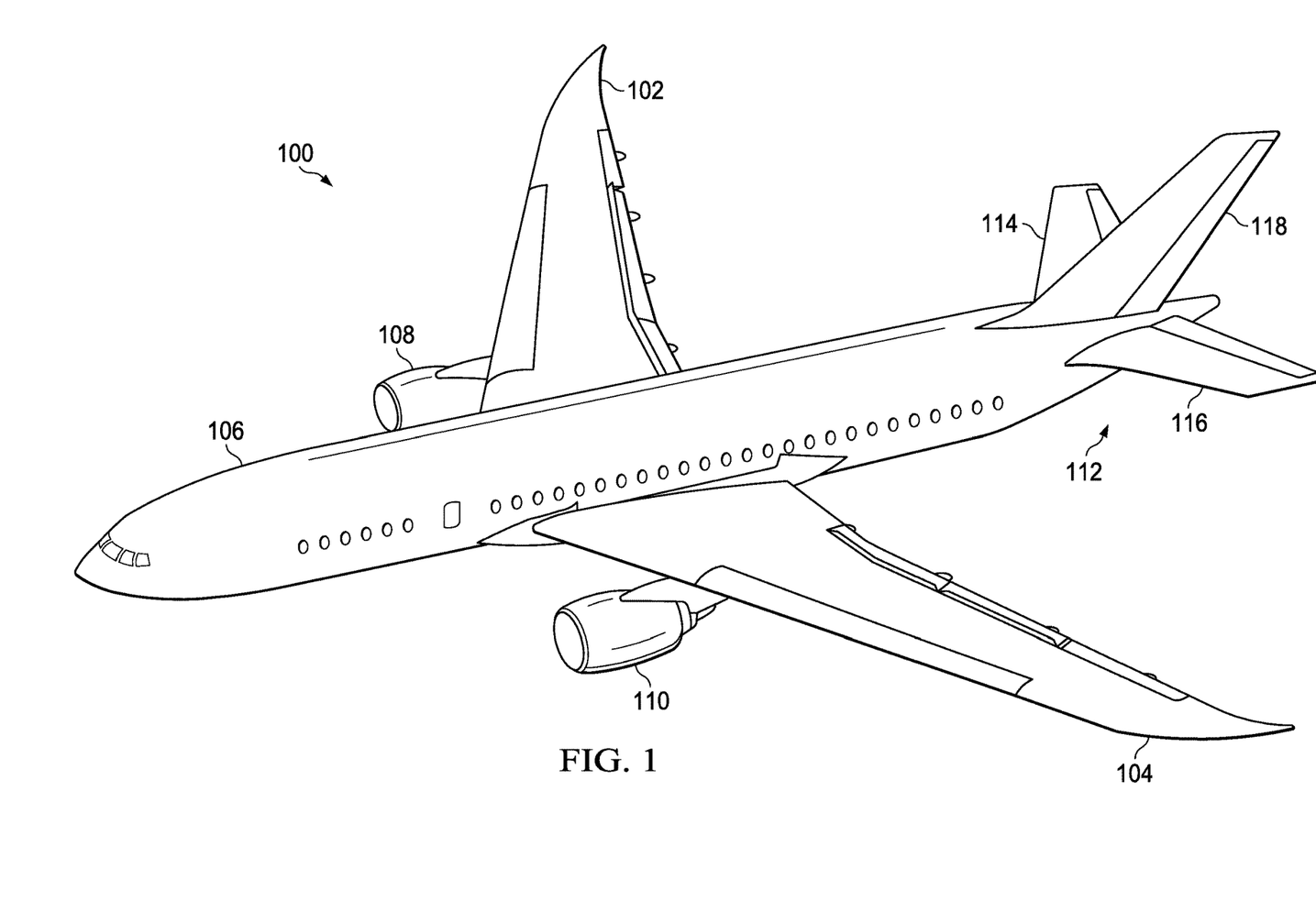
FIG. 1 is an illustration of an aircraft in which an illustrative embodiment may be implemented.

Referring now to the figures and, in particular, with reference to FIG. 1, an illustration of an aircraft is depicted in which an illustrative embodiment may be implemented. In this illustrative example, aircraft 100 has wing 102 and wing 104 connected to body 106. Aircraft 100 includes engine 108 connected to wing 102 and engine 110 connected to wing 104.

Body 106 has tail section 112. Horizontal stabilizer 114, horizontal stabilizer 116, and vertical stabilizer 118 are connected to tail section 112 of body 106.

Aircraft 100 is an example of an aircraft having an insulation system. For example, an insulation system runs within body 106. The insulation system discourages moisture from entering the passenger cabin of aircraft 100 within body 106.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Although the illustrative examples for an illustrative embodiment are described with respect to an aircraft, the illustrative embodiments may be applied to other types of structures. The structure may be, for example, a mobile structure, a stationary structure, a land-based structure, an aquatic-based structure, or a space-based structure. More specifically, the structure may be a surface ship, a tank, a personnel carrier, a train, a spacecraft, a space station, a satellite, a submarine, a manufacturing facility, a building, or other suitable structures.

Figure 2:
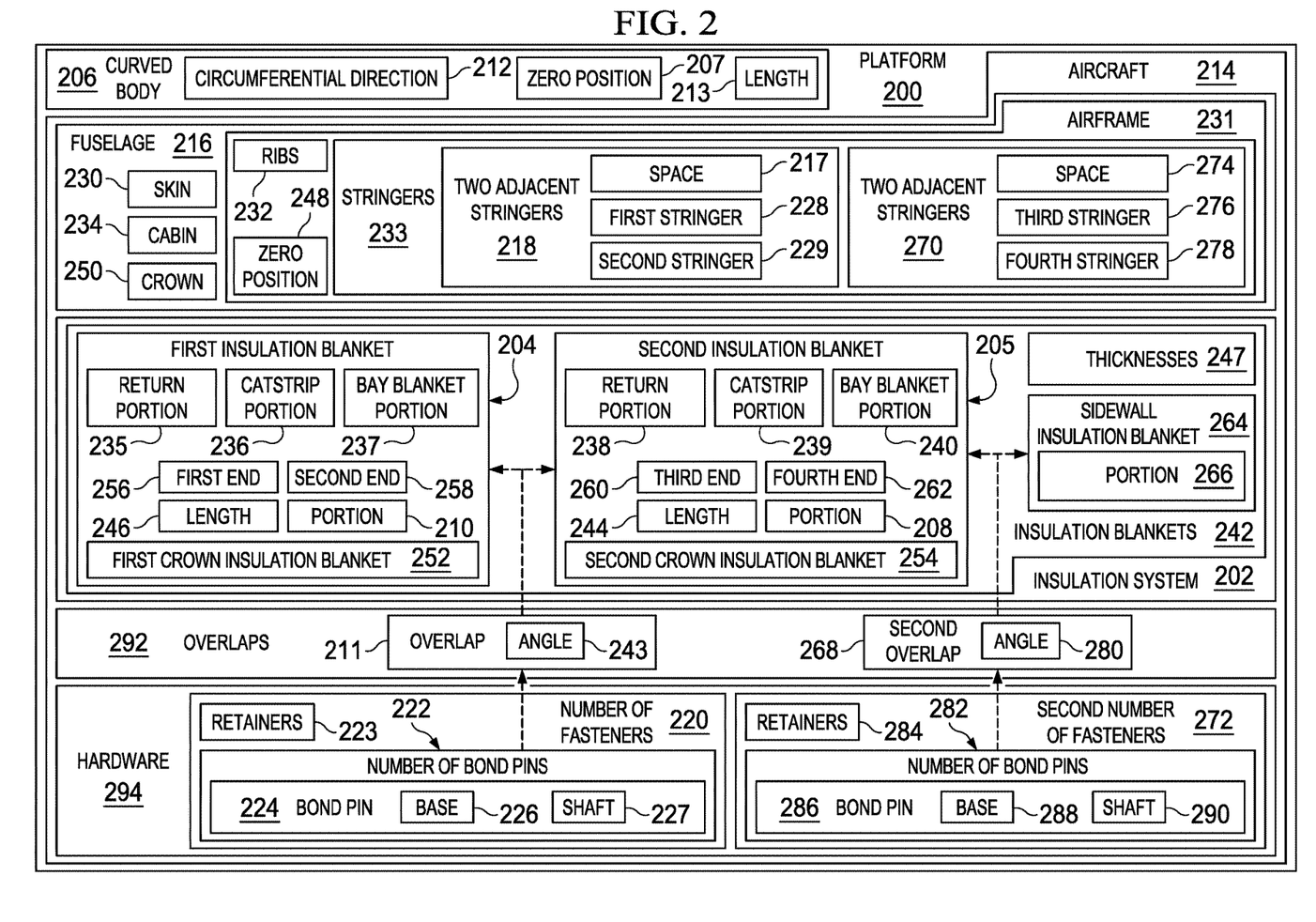
FIG. 2 is an illustration of a block diagram of a platform in accordance with an illustrative embodiment.

Turning now to FIG. 2, an illustration of a block diagram of a platform is depicted in accordance with an illustrative embodiment. Platform 200 of FIG. 2 includes insulation system 202. Insulation system 202 has first insulation blanket 204 and second insulation blanket 205. First insulation blanket 204 extends circumferentially within curved body 206. Second insulation blanket 205 extends circumferentially within curved body 206 and covers zero position 207 of curved body 206. Portion 208 of second insulation blanket 205 covers portion 210 of first insulation blanket 204 so that portion 208 of second insulation blanket 205 is between portion 210 of first insulation blanket 204 and curved body 206 to form overlap 211. Overlap 211 is positioned within a range having an absolute value of 5 to 40 degrees from zero position 207 of curved body 206.

By portion 208 of second insulation blanket 205 covering portion 210 of first insulation blanket 204, second insulation blanket 205 acts as a shingle in overlap 211. When second insulation blanket 205 acts as a shingle, moisture travels across an outboard surface of second insulation blanket 205 and onto the outboard surface of first insulation blanket 204 using gravitational force. By covering portion 208 of second insulation blanket 205 with portion 210 of first insulation blanket 204, overlap 211 is formed with a position, a length, and a compression such that in operation moisture is discouraged, by gravitational force, from traveling between second insulation blanket 205 and first insulation blanket 204 at overlap 211.

Zero position 207 is a position on curved body 206 in circumferential direction 212 of curved body 206. In some illustrative examples, zero position 207 of curved body 206 may also be referred to as a top of curved body 206 during manufacturing. In some illustrative examples, zero position 207 may be the point of curved body 206 farthest from a manufacturing floor during manufacturing. In some illustrative examples, zero position 207 is identified by a centerline of curved body 206 perpendicular to length 213 of curved body 206.

Curved body 206 has supports. These supports may take any desirable form or have any desirable shape. The supports may also be referred to as support members or frame members. The supports provide structural reinforcement to curved body 206. The supports may form a frame for curved body 206.

In some illustrative examples, platform 200 takes the form of aircraft 214. Aircraft 214 may be a block diagram representation of aircraft 100 of FIG. 1. When platform 200 takes the form of aircraft 214, zero position 207 may be the top of fuselage 216 during cruise operation of aircraft 214.

When platform 200 takes the form of aircraft 214, curved body 206 is fuselage 216. Overlap 211 is within space 217 between two adjacent stringers 218 of fuselage 216. Overlap 211 is secured to curved body 206 by number of fasteners 220 substantially centered between two adjacent stringers 218. As used herein, "a number of," when used with reference to items, means one or more items. Thus, number of fasteners 220 includes one or more fasteners.

When platform 200 takes the form of a structure other than aircraft 214, overlap 211 is within a space between two adjacent supports of curved body 206. Overlap 211 is secured to curved body 206 by number of fasteners 220 substantially centered between the two adjacent supports. Number of fasteners 220 pulls first insulation blanket 204 into contact with a first support of the two adjacent supports, and number of fasteners 220 pulls second insulation blanket 205 into contact with a second support of the two adjacent supports.

In some illustrative examples, number of fasteners 220 is number of bond pins 222. Bond pins may also be referred to as bond on pins or bond on index pins. In these illustrative examples, retainers 223 are associated with number of bond pins 222. Each bond pin 224 of number of bond pins 222 has base 226 attached to curved body 206 and shaft 227 extending outwardly from base 226 through first insulation blanket 204 and second insulation blanket 205. Retainers 223 interact with the shafts to retain first insulation blanket 204 and second insulation blanket 205. Although only bond pin 224 is depicted, number of bond pins 222 includes any desirable quantity of bond pins. In some illustrative examples, number of bond pins 222 includes two bond pins, each with a base and a shaft. In other illustrative examples, number of bond pins 222 includes more than two bond pins, each with a base and a shaft.

When platform 200 takes the form of aircraft 214, number of fasteners 220 pulls first insulation blanket 204 into contact with first stringer 228 of two adjacent stringers 218. Number of fasteners 220 pulls second insulation blanket 205 into contact with second stringer 229 of two adjacent stringers 218. Overlap 211 is compressed by number of fasteners 220.

Number of fasteners 220 retains first insulation blanket 204 and second insulation blanket 205 against two adjacent stringers 218. This tight retention provides a better moisture seal at overlap 211 than conventional overlaps. Retaining first insulation blanket 204 and second insulation blanket 205 against two adjacent stringers 218 substantially reduces moisture getting to the structure. The tight retention also reduces or eliminates moisture trapping between insulation system 202 and structures of fuselage 216. More specifically, the tight retention also reduces or eliminates moisture trapping between insulation system 202 and skin 230 and airframe 231 of fuselage 216.

Airframe 231 includes structural members of fuselage 216. Airframe 231 is formed of ribs 232 and stringers 233 including two adjacent stringers 218. Airframe 231 may also be referred to as a skeleton.

When referring to fuselage 216, an outboard direction is a direction from cabin 234 towards skin 230 of fuselage 216. An inboard direction is a direction from skin 230 of fuselage 216 towards cabin 234.

When second insulation blanket 205 acts as a shingle, liquid water is reduced or prevented from entering cabin 234 through overlap 211. When second insulation blanket 205 acts as a shingle, liquid water is reduced or prevented from traveling through overlap 211 using gravitational force.

First insulation blanket 204 has a plurality of regions. Second insulation blanket 205 also has a plurality of regions. First insulation blanket 204 has return portion 235, capstrip portion 236, and bay blanket portion 237. Second insulation blanket 205 has return portion 238, capstrip portion 239, and bay blanket portion 240. In some illustrative examples, number of fasteners 220 is at least two fasteners, and the at least two fasteners are evenly spaced along a width of bay blanket portion 237. Bay blanket portion 237 and bay blanket portion 240 have substantially the same width.

Return portion 235 and capstrip portion 236 are used to join first insulation blanket 204 to other insulation blankets of insulation blankets 242 in the direction of length 213 of curved body 206. Return portion 238 and capstrip portion 239 are used to join second insulation blanket 205 to other insulation blankets of insulation blankets 242 in the direction of length 213 of curved body 206.

Overlap 211 has angle 243 relative to zero position 207. Angle 243 is in the range of +/−5 degrees to 40 degrees. Range of angle 243 may be expressed as absolute value of 5 degrees to 40 degrees. Angle 243 may also be referred to as a position of overlap 211. Overlap 211 is positioned within a range of absolute value of 5 to 40 degrees from zero position 248 of the fuselage 216.

First insulation blanket 204 and second insulation blanket 205 extend away from overlap 211 to a position within a range having an absolute value of 50 to 80 degrees from zero position 207 of the curved body 206. Length 244 of second insulation blanket 205 is greater than length 246 of first insulation blanket 204.

Insulation blankets 242 have thicknesses 247. In some illustrative examples, thicknesses 247 of insulation blankets 242 are substantially the same. In other illustrative examples, thicknesses 247 of insulation blankets 242 have some different values. First insulation blanket 204 and second insulation blanket 205 each have a respective thickness in the range of three to five inches. Thickness of overlap 211 is up to ten inches. In some illustrative examples, overlap 211 compresses first insulation blanket 204 and second insulation blanket 205.

A length of overlap 211 is in the range of two to seven inches. In one specific non-limiting example, a length of overlap 211 is four inches.

In one illustrative example, aircraft 214 comprises airframe 231 and insulation system 202. Airframe 231 has stringers 233 and zero position 248 associated with crown 250 of airframe 231.

Insulation system 202 has overlap 211 secured only by number of fasteners 220. Overlap 211 is positioned relative to zero position 248 within a range having an absolute value of 5 to 40 degrees from zero position 248. Insulation system 202 comprises first crown insulation blanket 252, second crown insulation blanket 254, and number of fasteners 220.

First crown insulation blanket 252 has first end 256 at overlap 211 and second end 258 positioned relative to zero position 248 within a range having an absolute value of 50 to 80 degrees from zero position 248. Second crown insulation blanket 254 extending across zero position 248, wherein second crown insulation blanket 254 has third end 260 covering first end 256 of first crown insulation blanket 252 viewed from airframe 231 in an inboard direction to form overlap 211 and fourth end 262 positioned relative to zero position 248 within a range having an absolute value of 50 to 80 degrees from zero position 248. Number of fasteners 220 have shafts extending through first crown insulation blanket 252 and second crown insulation blanket 254 at overlap 211.

Aircraft 214 also includes sidewall insulation blanket 264. Fourth end 262 of second crown insulation blanket 254 covers portion 266 of sidewall insulation blanket 264 viewed from airframe 231 in an inboard direction to form second overlap 268. Second overlap 268 is positioned between two adjacent stringers 270 of stringers 233 of airframe 231.

Second overlap 268 is secured by only second number of fasteners 272. Second number of fasteners 272 have shafts extending through sidewall insulation blanket 264 and second crown insulation blanket 254 at second overlap 268. Second number of fasteners 272 is substantially centered between two adjacent stringers 270 of airframe 231. Second overlap 268 is positioned within space 274 between third stringer 276 and fourth stringer 278 of two adjacent stringers 270. Second overlap 268 is at angle 280 relative to zero position 248. Angle 280 is between an absolute value of 50 degrees to 80 degrees.

In some illustrative examples, second number of fasteners 272 is number of bond pins 282. In these illustrative examples, retainers 284 are associated with number of bond pins 282. Each bond pin 286 of number of bond pins 282 has base 288 attached to curved body 206 and shaft 290 extending outwardly from base 288 through second insulation blanket 205 and sidewall insulation blanket 264. Although only bond pin 286 is depicted, number of bond pins 282 includes any desirable quantity of bond pins. In some illustrative examples, number of bond pins 282 includes two bond pins, each with a base and a shaft. In other illustrative examples, number of bond pins 282 includes more than two bond pins, each with a base and a shaft. Retainers 284 interact with the shafts to retain second insulation blanket 205 and sidewall insulation blanket 264.

The illustration of platform 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, sidewall insulation blanket 264 may include a return portion, a capstrip portion, and a bay blanket portion although they are not depicted in FIG. 2. Further, overlaps 292 may include additional overlaps other than just overlap 211 and second overlap 268. An additional insulation blanket may form an overlap with first insulation blanket 204 although neither the overlap nor the additional insulation blanket is not depicted in FIG. 2. As another example, insulation blankets 242 may include enough crown insulation blankets to cover the length of fuselage 216.

Yet further, hardware 294 may include other types of joining components. For example, hardware 294 may include frame clamps to secure capstrip portions, such as capstrip portion 236 or capstrip portion 239, to one of stringers 233. As another example, hardware 294 may include hook and loop fasteners to secure capstrip portions, such as capstrip portion 236 or capstrip portion 239, to neighboring return portions of additional crown insulation blankets. Hook and loop fasteners may likewise secure return portions, such as return portion 235 or return portion 238, to neighboring capstrip portions of additional crown insulation blankets.

Figure 3:
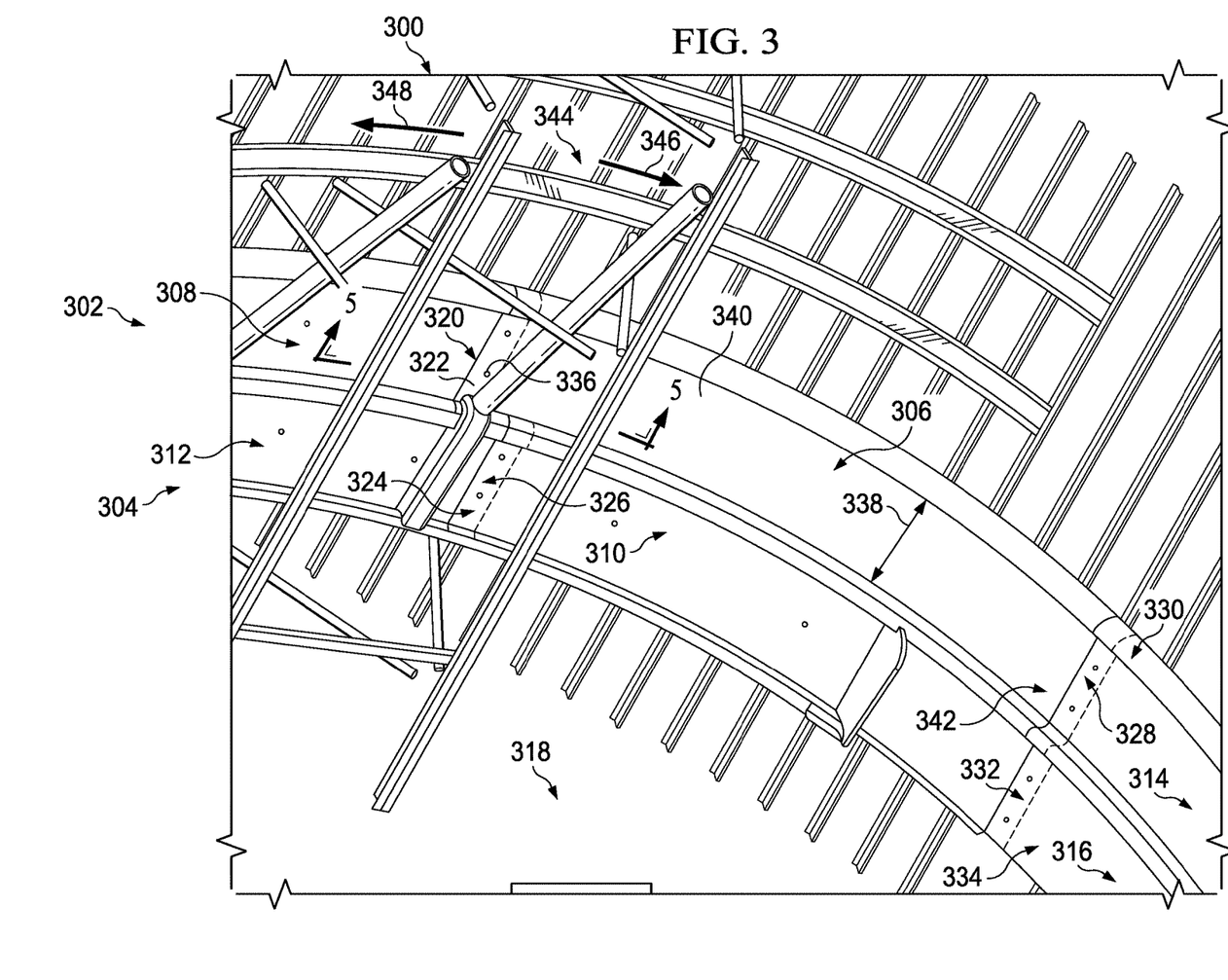
FIG. 3 is an illustration of an airframe and insulation blankets of an insulation system in accordance with an illustrative embodiment.

Turning now to FIG. 3, an illustration of an airframe and insulation blankets of an insulation system is depicted in accordance with an illustrative embodiment. Airframe 300 is a physical implementation of airframe 231 of FIG. 2. Airframe 300 is an example of an airframe within aircraft 100 of FIG. 1. Insulation blankets 302 are physical implementations of insulation blankets 242 of FIG. 2. Insulation blankets 302 are components of insulation system 304.

Insulation system 304 are only a portion of an insulation system in a flight-ready aircraft. FIG. 3 may be a view of an aircraft, such as aircraft 100, during installation of insulation blankets 302.

Insulation blankets 302 includes first crown insulation blanket 306, second crown insulation blanket 308, third crown insulation blanket 310, fourth crown insulation blanket 312, first sidewall insulation blanket 314, and second sidewall insulation blanket 316. FIG. 3 is a view from cabin 318 looking in an outboard direction.

Overlap 320 joins first crown insulation blanket 306 and second crown insulation blanket 308. As depicted, first crown insulation blanket 306 is extended circumferentially within airframe 300 so that portion 322 of first crown insulation blanket 306 covers a portion of second crown insulation blanket 308 when viewed in the outboard facing direction to form overlap 320. As depicted, overlap 320 is positioned between stringer three and stringer four of airframe 300. Stringer three and stringer four are a third stringer and a fourth stringer of airframe 300 relative to BL 0 of airframe 300. Overlap 320 is positioned at an angle in the range of an absolute value of 5 to 40 degrees relative to BL 0 of airframe 300.

Overlap 324 joins third crown insulation blanket 310 and fourth crown insulation blanket 312. As depicted, an intercostal is located between stringer 3 and stringer 4. As depicted, third crown insulation blanket 310 is extended circumferentially within airframe 300 so that portion 326 of third crown insulation blanket 310 covers a portion of fourth crown insulation blanket 312 when viewed in the outboard facing direction to form overlap 324. As discussed below in FIG. 9, when forming overlap 324, fourth crown insulation blanket 312 is extended circumferentially within airframe 300 so that fourth crown insulation blanket 312 covers portion 326 of third crown insulation blanket 310 when looking from airframe 300 inward towards the center. As depicted, overlap 324 is positioned between stringer four and stringer five of airframe 300. Stringer four and stringer five are a fourth stringer and a fifth stringer of airframe 300 relative to BL 0 of airframe 300. Overlap 324 is positioned at an angle in the range of an absolute value of 5 to 40 degrees relative to BL 0 of airframe 300.

Overlap 328 joins first crown insulation blanket 306 and first sidewall insulation blanket 314. As depicted, first sidewall insulation blanket 314 is extended circumferentially within airframe 300 so that portion 330 of first sidewall insulation blanket 314 covers a portion of first crown insulation blanket 306 when viewed in the outboard facing direction to form overlap 328. As depicted, overlap 328 is positioned between stringer sixteen and stringer seventeen. Stringer sixteen and stringer seventeen are a sixteenth stringer and a seventeenth stringer of airframe 300 relative to BL 0 of airframe 300. Overlap 328 is positioned at an angle in the range of an absolute value of 50 to 80 degrees relative to BL 0 of airframe 300.

Overlap 332 joins third crown insulation blanket 310 and second sidewall insulation blanket 316. As depicted, second sidewall insulation blanket 316 is extended circumferentially within airframe 300 so that portion 334 of second sidewall insulation blanket 316 covers a portion of third crown insulation blanket 310 when viewed in the outboard facing direction to form overlap 332. As depicted, overlap 332 is positioned between stringer sixteen and stringer seventeen. Stringer sixteen and stringer seventeen are a sixteenth stringer and a seventeenth stringer of airframe 300 relative to BL 0 of airframe 300. Overlap 332 is positioned at an angle in the range of an absolute value of 50 to 80 degrees relative to BL 0 of airframe 300.

As depicted, each of overlap 320, overlap 324, overlap 328, and overlap 332 are secured to airframe 300 using only a number of fasteners. As depicted, each of overlap 320, overlap 324, overlap 328, and overlap 332 uses two respective fasteners.

For example, overlap 320 has two bond pins 336 and associated retainers. Two bond pins 336 are evenly spaced across width 338 of bay blanket portion 340 of first crown insulation blanket 306.

Overlap 328 has two bond pins 342 and associated retainers. Two bond pins 342 are evenly spaced across width 338 of bay blanket portion 340 of first crown insulation blanket 306.

As can be seen in FIG. 3, first crown insulation blanket 306 and third crown insulation blanket 310 are joined by a respective return portion and a respective capstrip portion. Further, second crown insulation blanket 308 and fourth crown insulation blanket 312 are joined by a respective return portion and a respective capstrip portion. Thus, insulation system 304 will desirably have no gaps.

Although further crown insulation blankets are not depicted, additional crown insulation blankets will be installed to cover all of crown 344 of airframe 300. Further, additional sidewall insulation blankets will be installed to cover the sidewall of airframe 300. Although only one sidewall of airframe 300 is shown, another sidewall is present on the opposite side of BL 0 of airframe 300.

Because overlap 320 is offset from BL 0, first crown insulation blanket 306 and second crown insulation blanket 308 have different lengths in circumferential direction of airframe 300. Specifically, a length of second crown insulation blanket 308 is greater than a length of first crown insulation blanket 306. Because overlap 320 is offset from BL 0, third crown insulation blanket 310 and fourth crown insulation blanket 312 have different lengths in a circumferential direction of airframe 300. Specifically, a length of fourth crown insulation blanket 312 is greater than a length of third crown insulation blanket 310.

As depicted, overlap 320 is shifted clockwise 346 from BL 0. However, in other illustrative examples, overlap 320 may be shifted counter-clockwise 348 from BL 0. When overlap 320 is shifted counter-clockwise to BL 0, second crown insulation blanket 308 is extended circumferentially within airframe 300 so that a portion of second crown insulation blanket 308 covers portion 322 of first crown insulation blanket 306 when viewed in the outboard facing direction to form overlap 320.

Although each of overlap 320, overlap 324, overlap 328, and overlap 332 uses two respective fasteners as depicted, overlaps may include any desirable number of fasteners. For example, in other implementations, an overlap may only include one fastener. In other illustrative examples, an overlap may include more than two fasteners.

Figure 4:
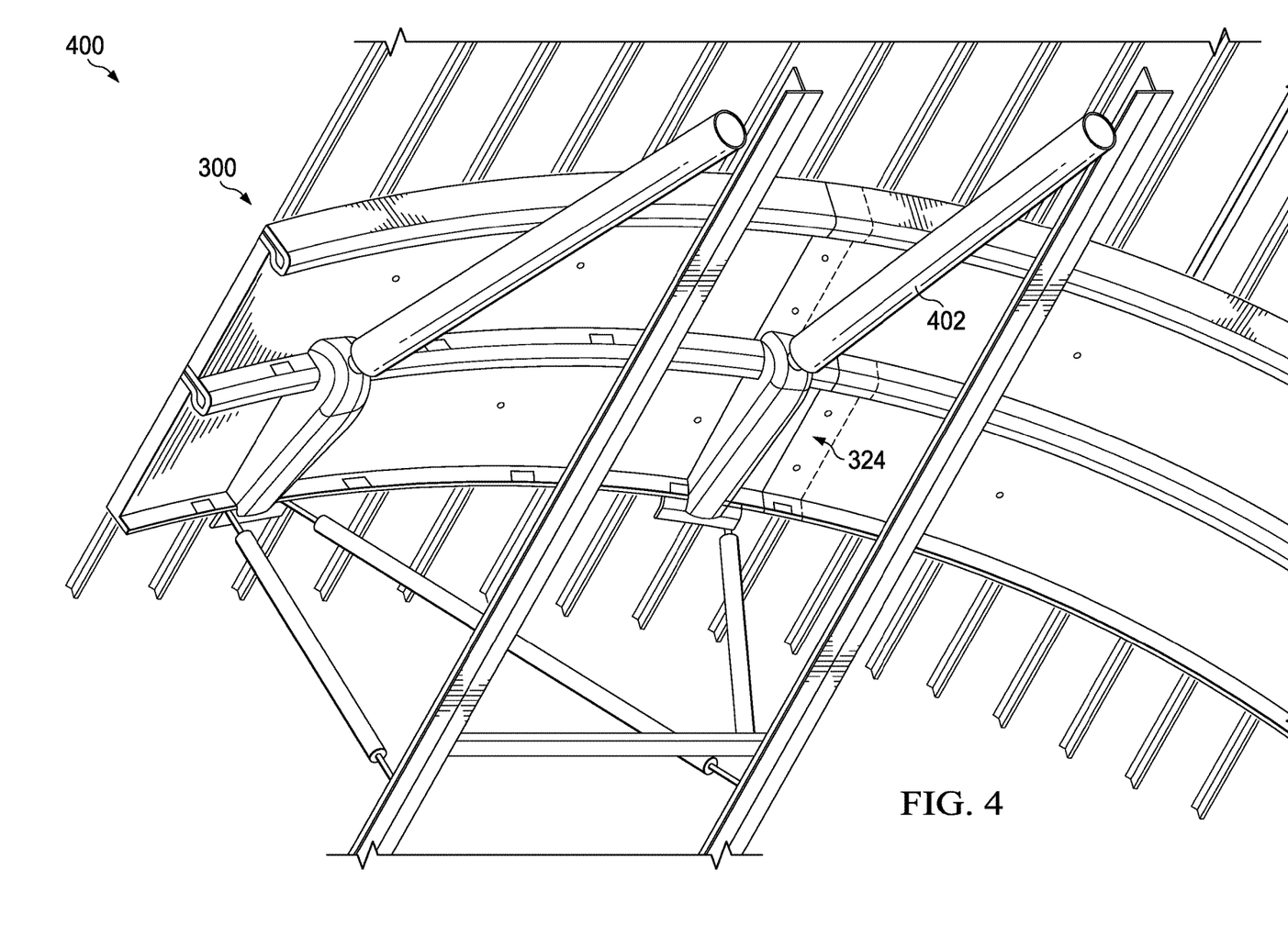
FIG. 4 is an illustration of an airframe and insulation blankets of an insulation system in accordance with an illustrative embodiment.

Turning now to FIG. 4, an illustration of an airframe and insulation blankets of an insulation system is depicted in accordance with an illustrative embodiment. View 400 is a zoomed in view of airframe 300 of FIG. 3. In view 400, surrounding structure 402 is visible. As can be seen in view 400, overlap 324 is present between stringer four and stringer five so as to not interfere with surrounding structure 402.

Figure 5:
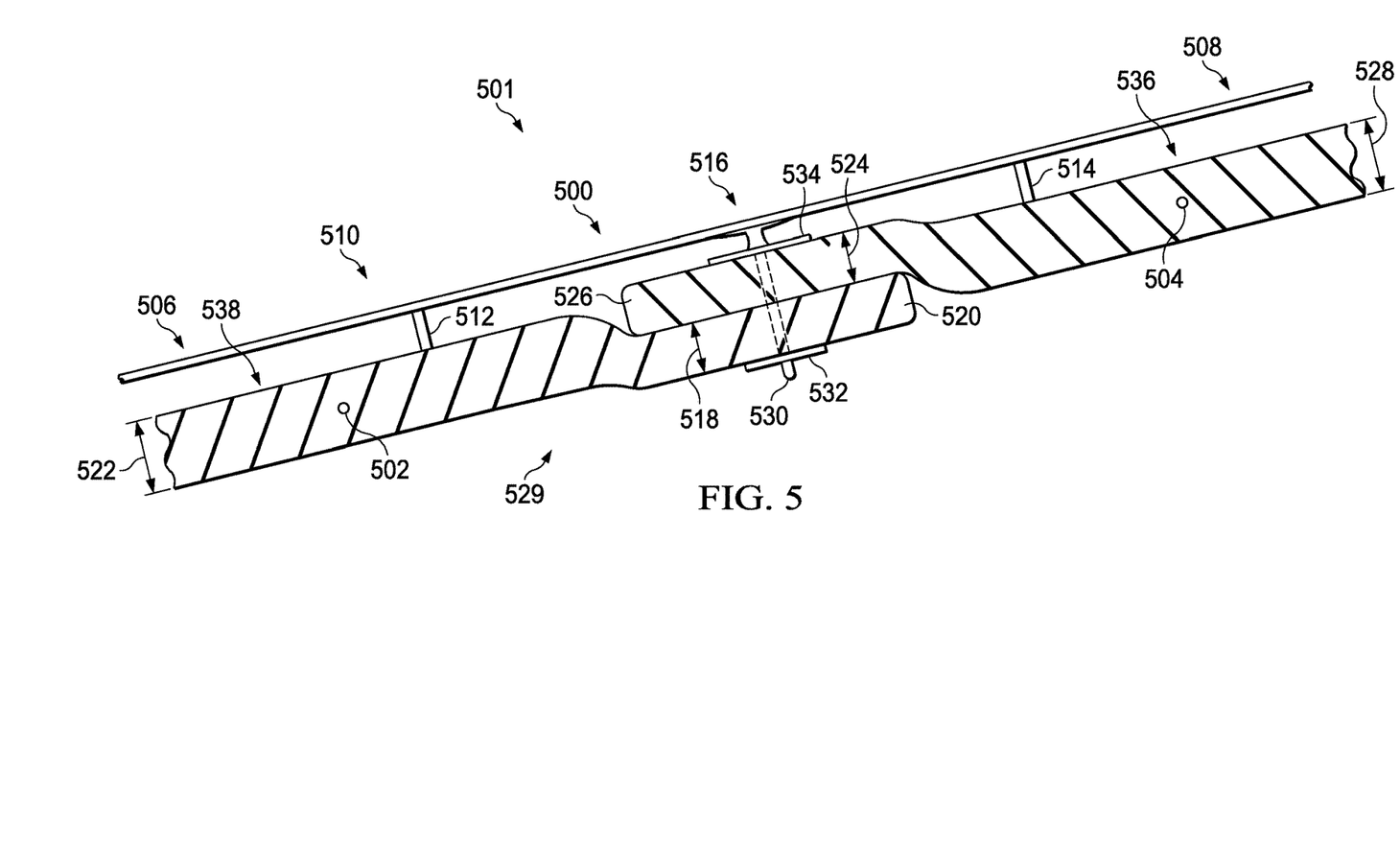
FIG. 5 is an illustration of a cross-sectional view of an overlap in an insulation system in accordance with an illustrative embodiment.

Turning now to FIG. 5, an illustration of a cross-sectional view of an overlap in an insulation system is depicted in accordance with an illustrative embodiment. Overlap 500 is a physical implementation of one of overlap 211 or second overlap 268 of FIG. 2. View 501 of overlap 500 may be a cross-sectional view of any of overlap 320, overlap 324, overlap 328, or overlap 332 of FIG. 3 from direction 5.

Overlap 500 is formed by first insulation blanket 502 and second insulation blanket 504. First insulation blanket 502 extends circumferentially within curved body 506. Curved body 506 includes skin 508 and stiffeners 510. Stiffeners 510 may also be referred to as stringers. In some illustrative examples, curved body 506 may be a fuselage of an aircraft. Stiffeners 510 include first stiffener 512 and second stiffener 514.

Number of fasteners 516 is substantially centered between first stiffener 512 and second stiffener 514. Number of fasteners 516 extends through first insulation blanket 502 and second insulation blanket 504 at overlap 500. Number of fasteners 516 compresses first insulation blanket 502 and second insulation blanket 504. Thickness 518 of portion 520 of first insulation blanket 502 in overlap 500 is less than thickness 522 of remainder of first insulation blanket 502. Thickness 524 of portion 526 of second insulation blanket 504 in overlap 500 is less than thickness 528 of remainder of second insulation blanket 504.

Number of fasteners 516 pulls first insulation blanket 502 against first stiffener 512. Number of fasteners 516 pulls second insulation blanket 504 against second stiffener 514. By pulling first insulation blanket 502 against first stiffener 512 and second insulation blanket 504 against second stiffener 514, moisture may be reduced or prevented between curved body 506 and insulation system 529 including first insulation blanket 502 and second insulation blanket 504.

Number of fasteners 516 includes number of bond pins 530 and number of retainers 532. In this example, number of retainers 532 is a number of discs slid onto the respective shafts of number of bond pins 530. Respective bases 534 of number of bond pins 530 are adhered to skin 508.

As depicted, portion 526 of second insulation blanket 504 is between portion 520 of first insulation blanket 502 and curved body 506. Second insulation blanket 504 acts as a shingle at overlap 500. Thus, gravity assists movement of liquid water across the outboard surface 536 of second insulation blanket 504 and onto the outboard surface 538 of first insulation blanket 502. Overlap 500 is formed with a position, a length, and a compression such that in operation moisture travels across outboard surface 536 of second insulation blanket 504 and onto outboard surface 538 of first insulation blanket 502 using gravitational force.

Figure 6:
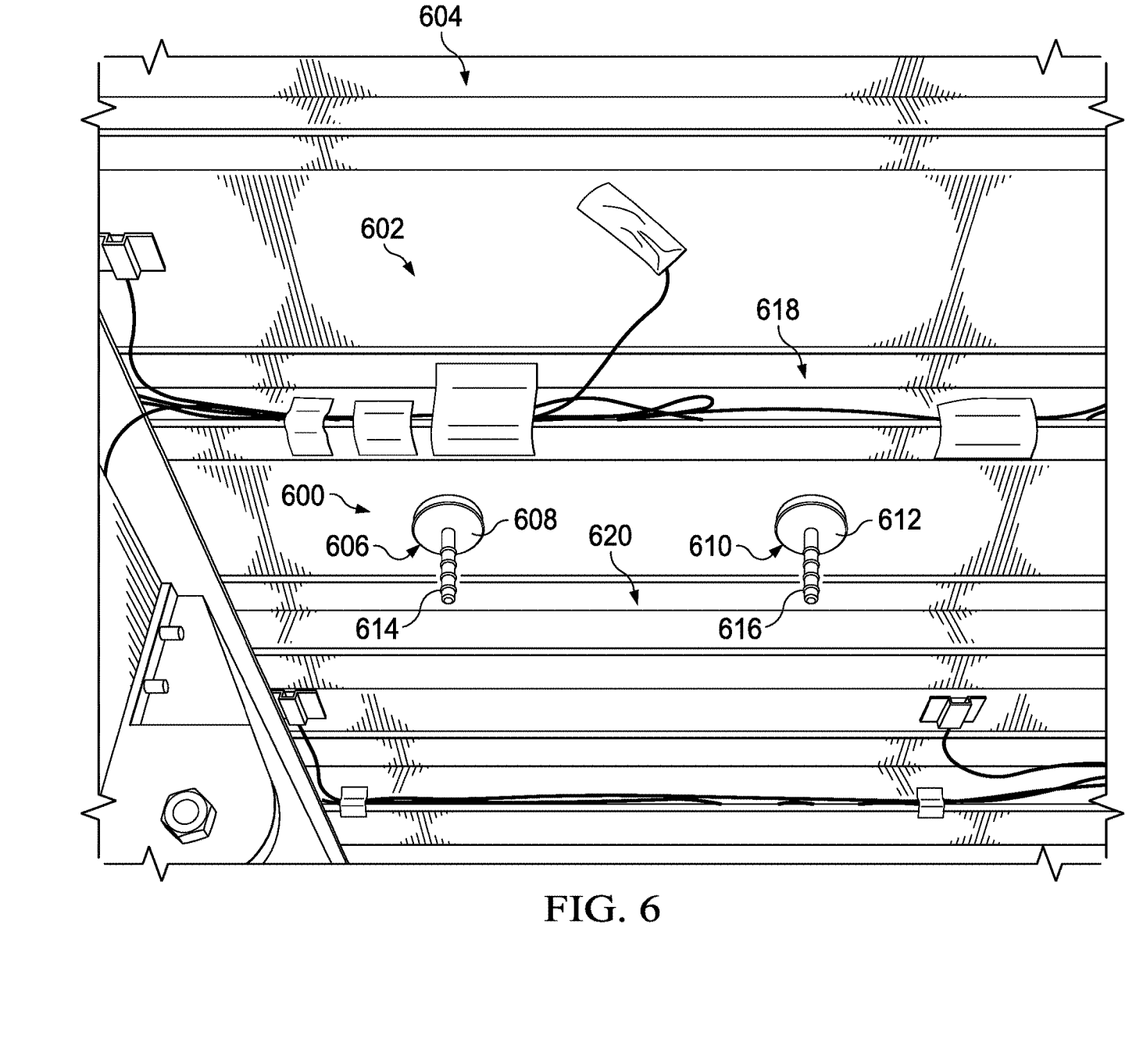
FIG. 6 is an illustration of an airframe and a number of bond pins for securing an overlap in accordance with an illustrative embodiment.

Turning now to FIG. 6, an illustration of an airframe and a number of bond pins for securing an overlap is depicted in accordance with an illustrative embodiment. Number of bond pins 600 is a physical implementation of number of bond pins 222 of FIG. 2. Number of bond pins 600 are examples of bond pins for a number of fasteners in any of overlap 320, overlap 324, overlap 328, or overlap 332 in FIG. 3.

Each bond pin of number of bond pins 600 has a respective base bonded to skin 602 of curved body 604. For example, first bond pin 606 has base 608. Second bond pin 610 has base 612. Each bond pin of number of bond pins 600 has a respective shaft extending away from skin 602 of curved body 604. For example, first bond pin 606 has shaft 614. Second bond pin 610 has shaft 616.

After extending the respective shafts of number of bond pins 600 through an overlap, retainer discs (not depicted) are slipped onto the respective shafts. As depicted, number of bond pins 600 is substantially centered between first stringer 618 and second stringer 620.

Figure 7:
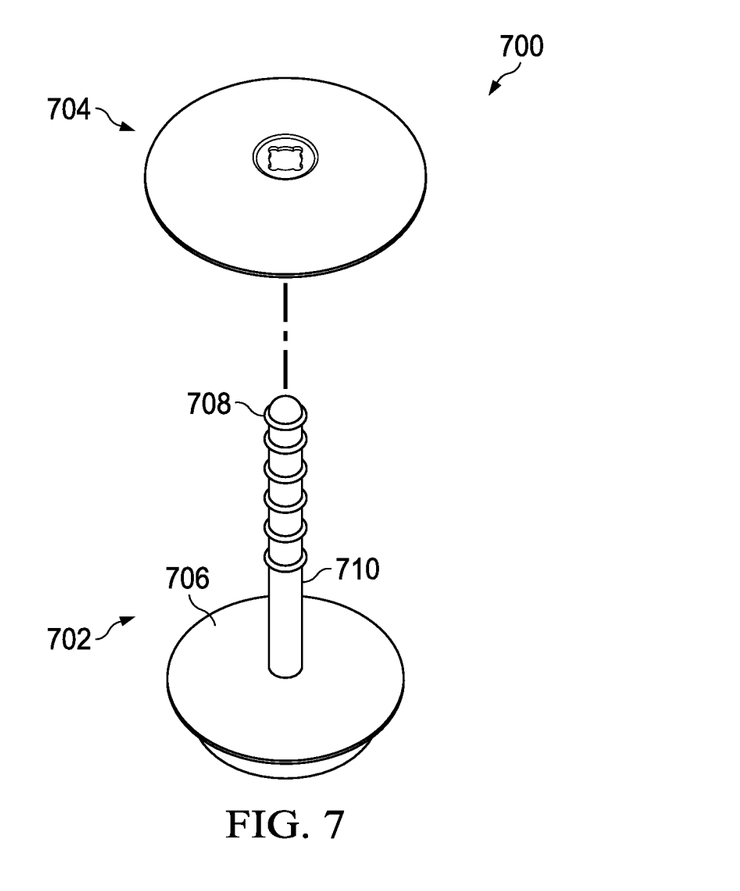
FIG. 7 is an illustration of an isometric view of a fastener of an insulation system in accordance with an illustrative embodiment.

Turning now to FIG. 7, an illustration of an isometric view of a fastener of an insulation system is depicted in accordance with an illustrative embodiment. Fastener 700 is a physical implementation of one of number of fasteners 220 shown in FIG. 2. Fastener 700 may be used in any of overlap 320, overlap 324, overlap 328, or overlap 332 shown in FIG. 3.

Fastener 700 includes bond pin 702 and retainer 704. Bond pin 702 has base 706. During assembly, base 706 is adhered to a skin of a curved body. Shaft 708 of bond pin 702 will extend into the curved body and away from the skin of the curved body.

Shaft 708 has locking components 710. After extending shaft 708 through an overlap of an insulation system, retainer 704 is placed over shaft 708. Locking components 710 interact with retainer 704 to hold retainer 704 in place relative to shaft 708.

Figure 8:
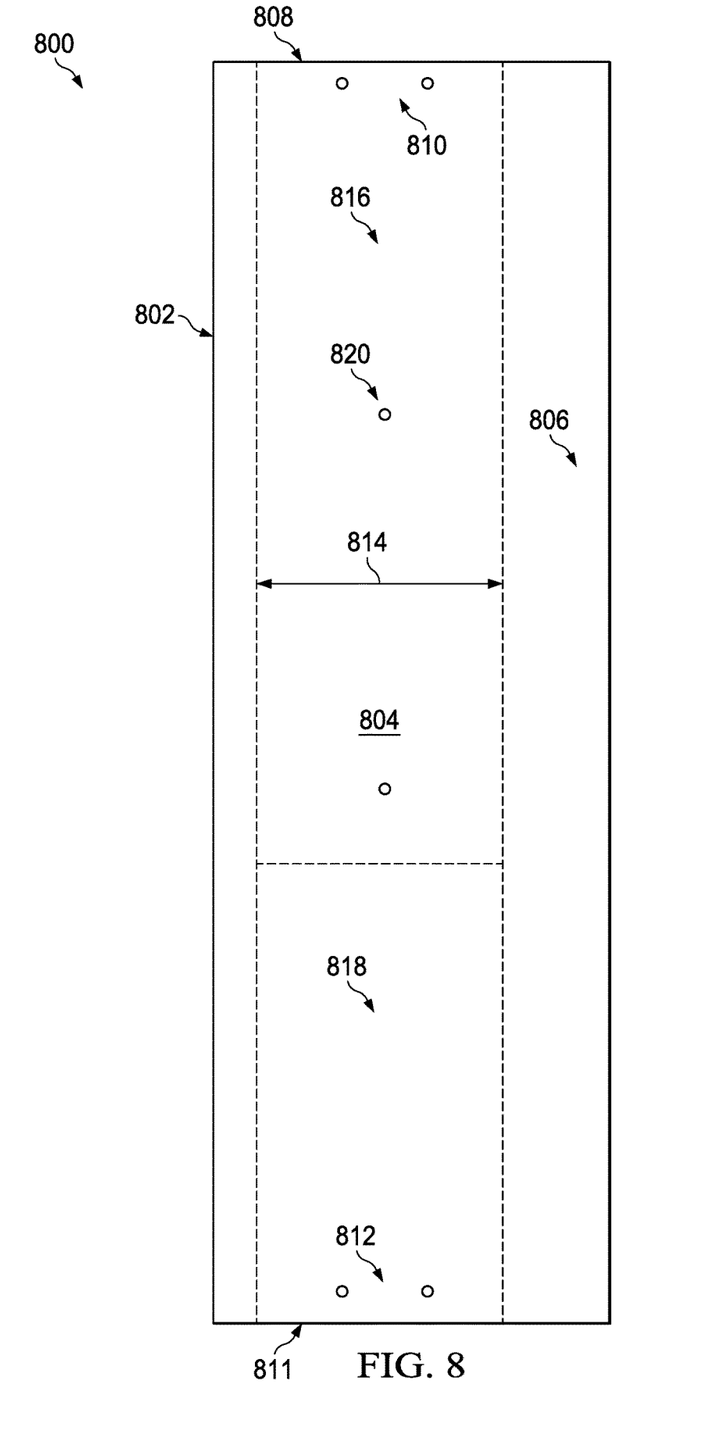
FIG. 8 is an illustration of a layout for an insulation blanket in accordance with an illustrative embodiment.

Turning now to FIG. 8, an illustration of a layout for an insulation blanket is depicted in accordance with an illustrative embodiment. Insulation blanket 800 is a physical implementation of an insulation blanket of insulation blankets 242 of FIG. 2. Insulation blanket 800 may be one of insulation blankets 302 of FIG. 3.

Insulation blanket 800 has return portion 802, bay blanket portion 804, and capstrip portion 806. Return portion 802 and capstrip portion 806 have any desirable form of connectors to join insulation blanket 800 to adjacent insulation blankets.

First end 808 of bay blanket portion 804 has locations 810 for a number of fasteners (not depicted). As depicted, locations 810 includes two locations for two fasteners. Second end 811 of bay blanket portion 804 has locations 812 for a number of fasteners (not depicted). As depicted, locations 812 includes two locations for two fasteners. Locations 810 and locations 812 are evenly spaced within width 814 of bay blanket portion 804.

As depicted, bay blanket portion 804 has two segments. Each segment of bay blanket portion 804 has its own respective thickness between three inches and five inches. In one non-limiting illustrative example, first segment 816 of bay blanket portion 804 may have a thickness of five inches while second segment 818 of bay blanket portion 804 may have a thickness of three inches.

Bay blanket portion 804 has locations 820. Index pins (not depicted) may extend through locations 820 to maintain alignment of insulation blanket 800 relative to a curved body (not depicted) when insulation blanket 800 is installed. The index pins are connected to the stringers. As a result, these index pins may also be referred to as stringer clip index pins. The index pins may also provide structural support to insulation blanket 800.

Figure 9:
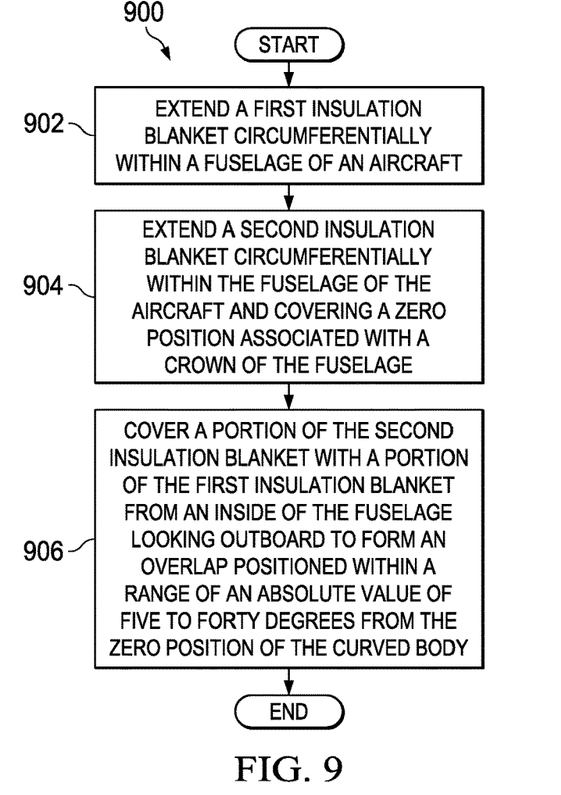
FIG. 9 is an illustration of a flowchart of a method for forming an overlap in an insulation system in accordance with an illustrative embodiment.

Turning now to FIG. 9, an illustration of a flowchart of a method for forming an overlap in an insulation system is depicted in accordance with an illustrative embodiment. Method 900 may be used to form insulation system 202 of FIG. 2. Method 900 may be used to form any of overlap 320, overlap 324, overlap 328, or overlap 332 of FIG. 3. Method 900 may be used to form overlap 500 of FIG. 5.

Method 900 extends a first insulation blanket circumferentially within a fuselage of an aircraft (operation 902). Method 900 extends a second insulation blanket circumferentially within the fuselage of the aircraft and covering a zero position associated with a crown of the fuselage (operation 904). Method 900 covers a portion of the second insulation blanket with a portion of the first insulation blanket from an inside of the fuselage looking outboard to form an overlap positioned within a range of an absolute value of 5 to 40 degrees from the zero position of the curved body (operation 906). Afterwards, the process terminates.

In some illustrative examples, covering a portion of the second insulation blanket with a portion of the first insulation blanket comprises forming the overlap with a position, a length, and a compression such that in operation moisture travels across an outboard surface of the second insulation blanket and onto the outboard surface of the first insulation blanket using gravitational force. In some illustrative examples, covering a portion of the second insulation blanket with a portion of the first insulation blanket comprises forming the overlap with a position, a length, and a compression such that in operation moisture is discouraged, by gravitational force, from traveling between the second insulation blanket and the first insulation blanket at the overlap.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In some illustrative examples, method 900 further comprises securing the overlap to the fuselage using a number of fasteners. In some further illustrative examples, method 900 securing the overlap to the fuselage using the number of fasteners comprises extending shafts of the number of fasteners through the first insulation blanket and the second insulation blanket, and attaching a respective retainer to each of the shafts.

Figure 10:
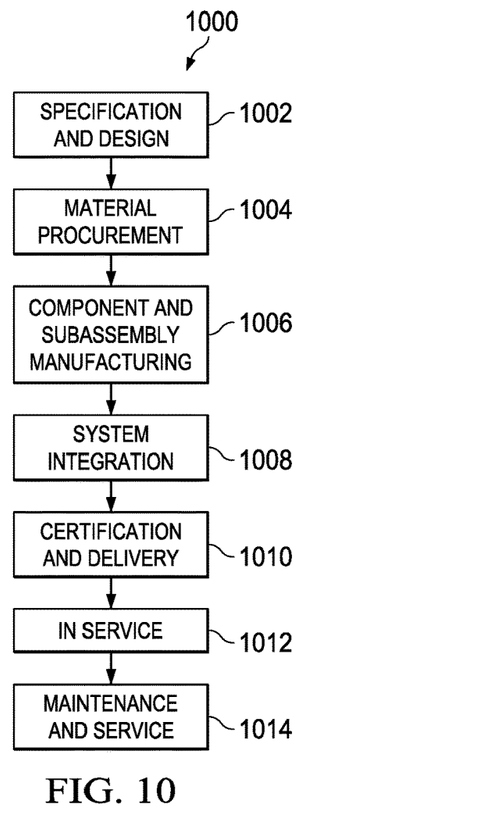
FIG. 10 is an illustration of an aircraft manufacturing and service method in the form of a block diagram in accordance with an illustrative embodiment.
Figure 11:
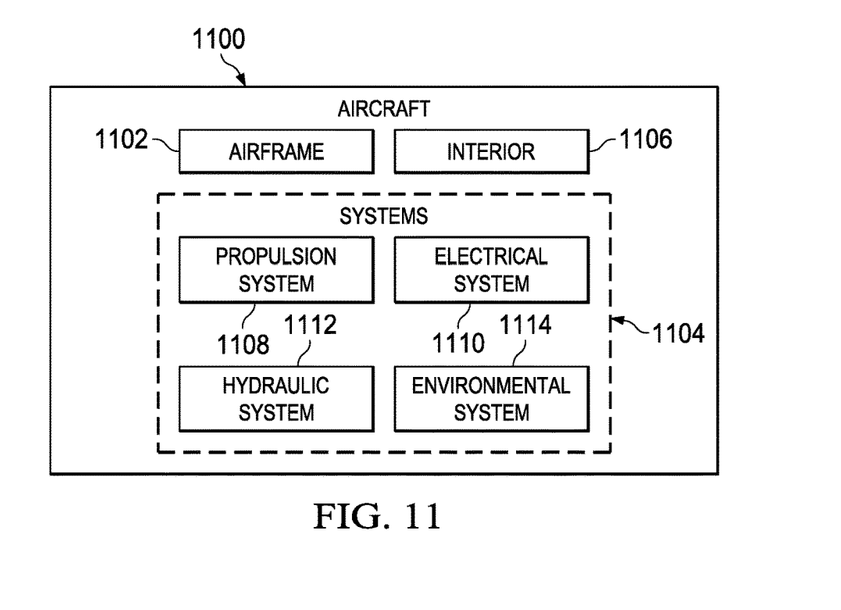
FIG. 11 is an illustration of an aircraft in the form of a block diagram in which an illustrative embodiment may be implemented.

Illustrative embodiments of the present disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 takes place. Thereafter, aircraft 1100 may go through certification and delivery 1010 in order to be placed in service 1012. While in service 1012 by a customer, aircraft 1100 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

One or more illustrative embodiments may be used during component and subassembly manufacturing 1006 of FIG. 10. For example, insulation system 202 of FIG. 2 may be installed during component and subassembly manufacturing 1006. Overlap 211 of FIG. 2 may be formed during component and subassembly manufacturing 1006 using method 900 of FIG. 9. Portions of insulation system 202, such as an insulation blanket of insulation blankets 242 may be used to replace insulation during maintenance and service 1014 of FIG. 10. Further, method 900 may be used to replace insulation during maintenance and service 1014 of FIG. 10.

The illustrative examples provide a method and apparatus for an insulation system. The insulation system reduces or prevents liquid water from entering the interior of a curved body. In some illustrative examples, the center of the curved body is a passenger cabin of an aircraft. The insulation system reduces moisture retention between insulation and a curved body. In some illustrative examples, the curved body is a skin and airframe of an aircraft.

The illustrative examples present devices to reduce water liquid and vapor transport through overlaps in thermal/acoustic insulation. For example, along the gap between crown and sidewall insulation conventional overlaps create paths for undesirable water liquid and vapor to pass through the insulation. These illustrative examples provide a method of attachment to keep insulation overlap firm against the stringer and each other that significantly reduce the size of water/vapor paths available to the current state-of-the-art airplane design.

The illustrative examples increase thickness of the insulation, modify the length of crown and sidewall insulations to shift the overlap between stringers pocket, and add bond on pins at the overlap. Adding more fiberglass material to insulation, shifting the overlap between stringers pocket, and adding more pin at the overlap helps tightly secure this soft material at the overlap and reduces water and vapor path compared to existing overlaps. Therefore, the illustrative examples provide improve airplane performance in terms of managing the environment inside the fuselage by providing less moisture loads.

An asserted goal for the illustrative examples is that design and installation of insulation blankets shall minimize moisture retention and prevent trapping of condensate between the outside of the insulation blanket and the skin and structure. In these illustrative examples, crown blanket overlap design is changed and shifted from a zero point, otherwise known as BL 0, to a lower stringer point (an asymmetric location) on either the left or right side of BL 0. The overlap may be positioned on either the right or left side due to surrounding systems installations, or other surrounding structures.

To secure the overlap between two crown blankets, in some illustrative examples, two bond on pins are installed on the skin between stringers 3 & 4 or 4 & 5. The location of the bond on pins is based on surrounding structures. As one example, the bond on pins are positioned between stringers 4 & 5 when a bay with intercostal structure located between stringers 3 & 4 is present. As used herein, bond on pins may also be referred to as bond pins or bond on index pins.

The bond on pins at the overlap are used to retain up to 10" thick (up to 5" fiberglass insulation for each blanket) insulation blankets tighter against the upstream or downstream adjacent stringers. This tight retention provides a better moisture seal at the overlaps and may prevent or substantially reduce moisture getting to the structure due to gravitational force or reverse chimney effect. The tight retention also reduces or eliminates moisture trapping between the insulation overlap, skin and frame structures.

Conventional designs for overlaps include hook & loop on the insulation blankets which increases the complexity of fabricating conventional insulation systems. The illustrative examples reduce fabrication time by securing the overlap using only a number of fasteners such as bond on pins.

In practice, conventional Hook and Loop (Velcro) attachments do not completely prevent moisture and liquid penetration through the attachment. Insulation blankets are made out of fiberglass material and due the soft nature of the material, during installation it is difficult to ensure hook and loop are complete engaged to prevent moisture and liquid penetration through the seam.

An asserted goal for the illustrative examples is to prevent uncontrolled liquid ingress into the passenger cabin. Conventional insulation blankets overlap with integrated incremental or continuous hook &loop at BL 0 or Stringer 16 with bond on pin or stringer clip pin. The hook & loop mechanical attachments may still allow some moisture and liquid travel through the overlap.

The illustrative examples shift the crown blankets overlap from BL 0 to stringer pocket between stringers 3 & 4 or 4 & 5. The shift to stringer pocket between stringers 3 & 4 or 4 & 5 helps mitigate liquid ingress through the bay and cap strip in the crown to the main cabin. The bond on pin with shifted (asymmetric) overlap helps to reduce or prevent any moisture and liquid penetration through the overlap and improves thermal and noise properties at the overlap across the upper lobe.

In some specific examples, the overlap of each of the up to 5" crown insulation blankets is compressed and retained to the skin with two bond on pins spaced evenly along the bay blanket width. As the flat surface of the bond on pin is more close to the skin than the stringer, it helps to hold insulation blankets snug against stringers and reduce or prevent moisture and liquid transportation through the overlap.

For a bay with upper intercostal between stringers 3 & 4, the overlap is shifted between stringer 4 and 5. The intercostal structure creates a void filled with cold air between insulation, skin and structures. Shifting the overlap aft of the intercostal causes the downstream warm moisture to work against the gravity in order to get to outboard cold structures. The illustrative examples provide improved performance for reducing moisture condensation around the overlap (e.g. crown blankets overlap, crown and sidewall blanket overlap). This design causes one of the crown blankets to be longer than the other crown blanket. In one specific and non-limiting example, the right hand side (RHS) crown blanket is longer than left hand side (LHS) crown blanket. The width of the blanket may not change from conventional designs. In some illustrative examples, the width may be approximately 20".

In some illustrative examples, crown blankets overlap are shifted anti-clock wise from BL 0 to the middle of the stringer pocket between stringers 3L & 4L. In one specific non-limiting example, this shift provides better sloping angle (~11 degree). This shift helps to utilize gravitation force to direct the upstream frost melt liquid from the locations higher above (e.g. BL 0, Str1, Str2 and etc) to the lower point and reduces or prevents moisture ingress in the main cabin.

In the illustrative examples, the conventionally symmetrical crown overlap is moved to asymmetric position. This asymmetric position uses gravity in our favor to overcome frost and liquid ingress through the overlap. The overlap is between two and seven inches. In one specific non-limiting example, the overlap between the two blankets is 4 inches. Note: Similar outcome can be achieved by varying the angle from 5 degrees to 40 degrees for crown blanket overlap.

Conventional overlaps between sidewall and crown blankets are placed above a stringer. In these illustrative examples, the sidewall and crown blanket overlap was moved to between adjacent stringers. An overlap between the sidewall and crown blanket positioned between adjacent stringers achieves better seal and reduces or prevents outboard airflow between outboard on insulation and primary airplane strictures. Thus, repositioning sidewall and crown blanket overlaps to between adjacent stringers significantly reduces frost on the outboard side of insulation. Similar result can be achieved for angle between 50 degrees to 80 degrees. In this case the overlap between blankets is in the range of 2 inches to 7 inches.

With the illustrative examples, the raw material is simplified and made out of between 3 and 5 inches of fiberglass material for the crown blankets. The thickness of the crown blankets is selected from this range based on noise and thermal requirements.

An insulation blanket assembly is made out of 3 detail sections: a bay blanket, a capstrip blanket, and a return blanket. The bay blanket insulates structures e.g. skin, stringers, intercostal and etc. between the frames. The capstrip blanket is wrapped around the frame to insulate the structures. The return blanket is a thin insulation material or coverfilm. The return blanket retains both edges of the bay blanket close to the skin with a metal clamp installed on the frame above the capstrip blanket.

A return insulation blanket is made from lesser thick insulation (fiberglass) material and covered with coverfilm. The primary function of a return and a coverfilm are the same. Using a coverfilm instead of return blanket reduces the weight impact of an insulation blanket.

A coverfilm is an extension of the cover film from the blanket edge. The cover film may be a composite material consisting of thin plastic film bonded to a fabric tear stopper of either reinforcing warp and fill yarns or non-woven fiber mat.

The coverfilm acts as a vapor barrier (due to low permeance) and provides a shingle to shed liquid water between adjacent blankets. When the onion skin-like cover film (tab) is wrapped around the airplane fuselage frames underneath the capstrip of an adjacent blanket, it acts as vapor barrier to prevent moisture ingress to/from the cabin, provides a path for liquid condensate flowing from the space between the blanket and fuselage structure, and provides an adequate support to the blanket edge when clamped to the airframe using a spring clamp or other attachment devises.

On this asymmetric overlap concept the blanket from the right side is on the outboard side working as a shingle to prevent water getting to the inboard side of insulation. Therefore, reducing the risk of rain the plane in the main cabin.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An insulation system comprising:
   a first insulation blanket extending circumferentially within a curved body; and
   a second insulation blanket extending circumferentially within the curved body and covering a zero position of the curved body, wherein the zero position is defined at a crown of the curved body, wherein a portion of the second insulation blanket covers a portion of the first insulation blanket so that the portion of the second insulation blanket is between the portion of the first insulation blanket and the curved body to form an overlap, and wherein the overlap is positioned within a range having an absolute value of 5 to 40 degrees from the zero position of the curved body.

2. The insulation system of claim 1, wherein the overlap is within a space between two adjacent supports of the curved body, wherein the two adjacent supports of the curved body extend longitudinally along a length of the curved body.

3. The insulation system of claim 1, wherein the overlap is secured to a skin of the curved body by a number of fasteners substantially centered between two adjacent supports of the curved body, wherein the two adjacent supports of the curved body extend longitudinally along a length of the curved body.

4. The insulation system of claim 3, wherein the number of fasteners is a number of bond pins, each bond pin of the number of bond pins having a base attached to the curved body and a shaft extending outwardly from the base through the first insulation blanket and the second insulation blanket.

5. The insulation system of claim 3, wherein the number of fasteners pulls the first insulation blanket into contact with a first support of the two adjacent supports, and wherein the number of fasteners pulls the second insulation blanket into contact with a second support of the two adjacent supports.

6. The insulation system of claim 3, wherein the first insulation blanket has a bay blanket portion, wherein the number of fasteners is at least two fasteners, and wherein the at least two fasteners are evenly spaced along a width of the bay blanket portion.

7. The insulation system of claim 3, wherein the overlap is compressed by the number of fasteners.

8. The insulation system of claim 1, wherein the first insulation blanket and the second insulation blanket extend away from the overlap to a position within a range having an absolute value of 50 to 80 degrees from the zero position of the curved body.

9. The insulation system of claim 1, wherein a length of the second insulation blanket is greater than a length of the first insulation blanket.

10. The insulation system of claim 1, wherein the first insulation blanket and the second insulation blanket each have a respective thickness in a range of three to five inches.

11. The insulation system of claim 1, wherein the overlap is in a range of two to seven inches.

12. An aircraft comprising:
    an airframe having a curved body with stringers, the curved body having a zero position defined at a crown of the curved body of the airframe; and
    an insulation system having an overlap secured only by a number of fasteners, wherein the overlap is positioned relative to the zero position within a range having an absolute value of 5 to 40 degrees from the zero position, the insulation system comprising:
a first crown insulation blanket extending circumferentially within the curved body of the airframe and having a first end at the overlap and a second end positioned relative to the zero position within a range having an absolute value of 50 to 80 degrees from the zero position;
a second crown insulation blanket extending circumferentially within the curved body of the airframe across the zero position, wherein the second crown insulation blanket has a third end covering the first end of the first crown insulation blanket viewed from the airframe in an inboard direction to form the overlap and a fourth end positioned relative to the zero position within a range having an absolute value of 50 to 80 degrees from the zero position; and
the number of fasteners having shafts extending through the first crown insulation blanket and the second crown insulation blanket at the overlap.

13. The aircraft of claim 12 further comprising:
a sidewall insulation blanket, wherein the fourth end of the second crown insulation blanket covers a portion of the sidewall insulation blanket viewed from the airframe in an inboard direction to form a second overlap, and wherein the second overlap is positioned between two adjacent stringers of the stringers of the airframe.

14. The aircraft of claim 13, wherein the second overlap is secured by only by a second number of fasteners, wherein the second number of fasteners have shafts extending through the sidewall insulation blanket and the second crown insulation blanket at the second overlap.

15. The aircraft of claim 14, wherein the second number of fasteners is substantially centered between two adjacent stringers of the airframe.

16. A method comprising:
extending a first insulation blanket circumferentially within a fuselage of an aircraft;
extending a second insulation blanket circumferentially within the fuselage of the aircraft and covering a zero position of the fuselage, wherein the zero position is defined at a crown of the fuselage; and
covering a portion of the second insulation blanket with a portion of the first insulation blanket from an inside of the fuselage looking outboard to form an overlap positioned within a range of absolute value of 5 to 40 degrees from the zero position of the fuselage.

17. The method of claim 16 further comprising:
securing the overlap to the fuselage using a number of fasteners.

18. The method of claim 17, wherein securing the overlap to the fuselage using the number of fasteners comprises:
extending shafts of the number of fasteners through the first insulation blanket and the second insulation blanket; and
attaching a respective retainer to each of the shafts.

19. The method of claim 16, wherein covering the portion of the second insulation blanket with the portion of the first insulation blanket comprises forming the overlap with a position, a length, and a compression such that in operation moisture travels across an outboard surface of the second insulation blanket and onto the outboard surface of the first insulation blanket using gravitational force.

20. The method of claim 16, wherein covering the portion of the second insulation blanket with the portion of the first insulation blanket comprises forming the overlap with a position, a length, and a compression such that in operation moisture is discouraged, by gravitational force, from traveling between the second insulation blanket and the first insulation blanket at the overlap.

\* \* \* \* \*